Jan. 13, 1959     E. HENSCHEN ET AL     2,868,243
CONTAINER FEEDING ARRANGEMENT

Filed Dec. 19, 1956     2 Sheets-Sheet 1

INVENTOR
EDGAR HENSCHEN

Jan. 13, 1959     E. HENSCHEN ET AL     2,868,243
CONTAINER FEEDING ARRANGEMENT
Filed Dec. 19, 1956                                 2 Sheets—Sheet 2

INVENTOR
EDGAR HENSCHEN

BY *Cushman, Darby & Cushman*
ATTORNEYS

United States Patent Office 2,868,243
Patented Jan. 13, 1959

2,868,243

CONTAINER FEEDING ARRANGEMENT

Edgar Henschen, Towson, Md., and Frank Lyman, Spokane, Wash., assignors to Crown Cork & Seal Company, Inc., Baltimore, Md., a corporation of New York Application December 19, 1956, Serial No. 629,377

11 Claims. (Cl. 141—168)

The present invention relates to filling apparatus and, more particularly, to an arrangement for transferring containers to and from a filling machine.

The invention as herein disclosed is embodied in a milk filling apparatus. However, it will be understood that the invention as disclosed herein may be incorporated in machines for filling containers with other substances.

Apparatus heretofore used in filling and closing containers for substances such as milk, have been made adjustable to handle containers of various heights and diameters. A typical milk filling apparatus is shown in the prior United States Patent No. 2,329,954, issued September 21, 1943 to Robert J. Stewart and Henry H. Franz. The containers to be filled are fed by an endless flat top conveyor from bottle washers to a rotary dial or spider having pockets on its periphery. The rotary dial transfers the containers in spaced relationship with each other and positions them on the container supporting platforms of the rotary filling machine. After the containers are positioned on the container supporting platforms, the platforms are raised so that the container engages a filling head positioned above each of the platforms and then the container is filled. Suitable pocketed dials are provided for removing the filled containers from the filling machine and transferring them to suitable capping apparatus. After the containers are capped on the rotary capping apparatus they then are removed therefrom by suitable pocketed dials and transferred to an endless take-off conveyor where they are conveyed to casing apparatus.

As mentioned above the prior machines have been adjustable for different size containers within a certain height range and diameter range. The aforementioned Stewart et al. patent discloses apparatus for simultaneously adjusting the filling machine and capping mechanism to accommodate containers of different heights. Containers of different sizes within a specified range, as determined by the size of the rotary filling machine, required merely that the infeed and outfeed dials be replaced by dials having pockets of the size of the particular container which is desired to be filled.

Present-day filling necessities require that containers of one gallon size be filled and the prior apparatus of the aforementioned Stewart et al. patent could not heretofore be converted to accommodate such a large size container without major re-design of the infeed and outfeed star wheels and a change of sprockets and gearing in the driving mechanism so as to change the timing of the dials with less pockets. The machines could adequately accommodate the gallon size containers for height but the conversion of the apparatus for the larger diameter container required considerable expense and time.

An object of the present invention is to provide an arrangement for transferring containers to and from a filling machine adapted to be used with existing standard equipment.

Another object of the present invention is to provide a rotary transfer dial for use with existing standard bottle equipment, the rotary transfer dial being interchangeable with existing rotary transfer dials and capable of transferring containers of much larger size than heretofore possible.

Still another object of the present invention is to provide a rotary transfer dial for bottling equipment interchangeable with rotary dials now presently used, the rotary transfer dial of the present invention being interchangeable with standard rotary dials without the necessity of changing the timing of the filling machine, capping mechanism or drives for the rotary transfer dials.

A still further object of the present invention is to provide a container feeding arrangement for large containers, the container feeding arrangement being such as to accommodate for the large diameter of the containers when they are transferred to and from the filling machine and capping mechanism.

Still another object of the present invention is the provision of filling apparatus which may be converted to handle different size containers in a minimum of time.

These and other objects of the present invention will appear more fully in the following specification, claims and drawings, wherein:

Figure 1:
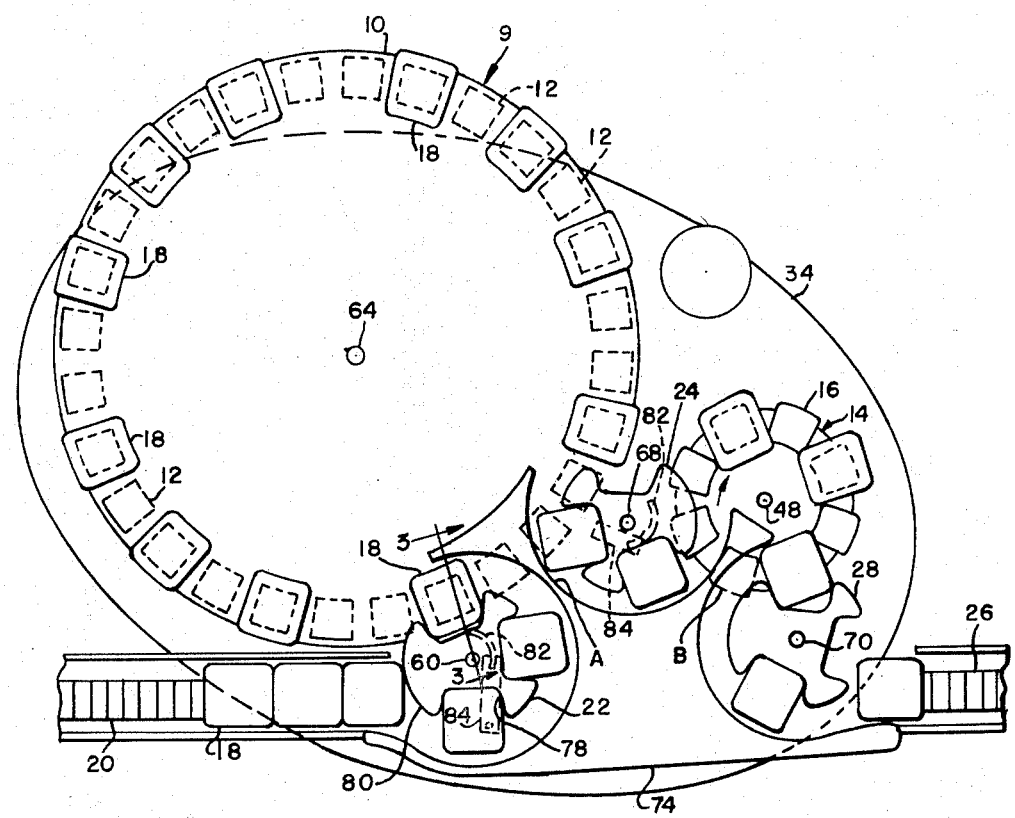
Figure 1 is a plan view of the container feeding arrangement of the present invention showing the rotary table portion of the filling machine and capping mechanism but omitting the superstructure for purposes of clarity.
Figure 4:
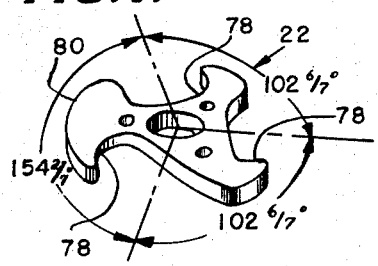
Figure 4 is a perspective view of a container transfer dial of the present invention.

Referring to the drawings, wherein like characters or reference numerals represent like or similar parts, the present machine comprises a filling machine 9 including a rotary filling table 10 having a plurality of container supporting platforms 12 vertically reciprocable with respect to the table 10, and a capping mechanism 14 also having a plurality of vertical reciprocal container supporting platforms 16. Containers, such as bottles, 18 are moved to the machine upon a straight line endless conveyor 20 to an infeed dial or spider 22 where they are received and transferred onto the container supporting platforms 12 of the rotary filling machine 10. The containers are filled while on the platforms 12 and then are transferred by an outfeed dial or spider 24 to the platforms 16 of the capping mechanism 14. After caps are applied to containers 18, the containers are transferred from the platforms 16 to an endless conveyor 26 by means of a transfer dial or spider 28. The filled capped containers are then conveyed to other apparatus in the bottling plant, such as case filling machines or the like, not shown.

Figure 3:
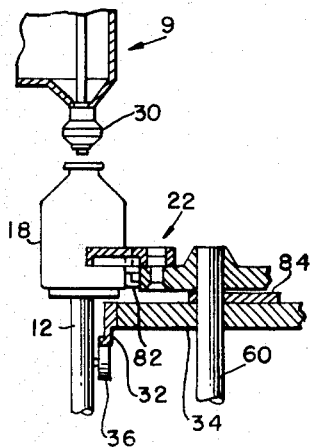
Figure 3 is a sectional view taken on the line 3—3 of Figure 1 and showing a fragmentary portion of the superstructure of the filling machine.

The general arrangement of the filling machine 9 and the capping mechanism 14 is similar to that disclosed in the aforementioned Stewart and Franz patent. As shown in Figure 3 the rotary table 10 which is adapted to rotate on a vertical axis also includes a filling head or valve 30 positioned above and in vertical alignment with each of the container supporting platforms 12. As the table 10 rotates in a clockwise direction, the platforms 12 pass the infeed station and receive containers 18 from the infeed dial 22. The platforms, after containers are positioned thereon, are raised vertically by action of a spring (not shown) so as to bring the containers into contact with the filling valve 30. The filling valves 30 are operated to open or flowing position by contact of the mouth of the container therewith, as disclosed in the prior United States Patent No. 2,364,400 issued December 5, 1944 to Robert J. Stewart and Henry H. Franz. After the containers have been filled as the filling table 10 rotates, the platforms 12 are lowered by a cam 32 attached to the stationary work table or frame 34 due to the engagement of a roller 36 carried by the platform 12 therewith. The containers 16 are removed from the lowered platforms 12 by the transfer or outfeed spider 24 which also acts as an infeed spider for the capping mechanism 14.

The capping mechanism 14 includes a capping element (not shown) positioned above each platform 16 and the container is raised by the platform 16 into engagement with the capping element where the cap is applied. When capping is completed the capping mechanism platform 16 is lowered and the container is transferred therefrom by the capping mechanism outfeed dial 28 to the take-off endless conveyor 26.

Figure 5:
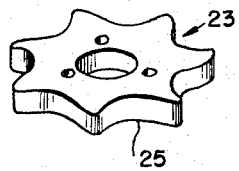
Figure 5 is a perspective view of a container transfer dial heretofore used with bottling equipment and replaceable by the dial of Figure 4 when containers of larger sizes are to be filled and closed.

As previously mentioned, the general arrangement of the filling machine 9, capping mechanism 14 and the feed of containers to and from these units is substantially similar to that disclosed in the aforementioned Stewart and Franz Patent No. 2,329,954. The standard filling and capping machine now in use can accommodate containers 18 which range in bottle size from half pints to half gallons. Such standard apparatus normally includes a filling machine 10 having twenty-eight container supporting platforms 12 and a capping mechanism 14 having eight container receiving platforms 16. A dial or spider 23, such as disclosed in Figure 5, is used with present-day standard filling machines 9 and capping mechanisms 14 in place of the dials 22, 24 and 28 of the present arrangement. Dials 23 are provided on their periphery with seven equally spaced container receiving pockets 25. Since the filling machine has twenty-eight container receiving platforms and the dial 23 has seven equally spaced pockets, the dial 23 must rotate four complete revolutions for each complete revolution of the filling table. This timing of the dial 23 with respect to the filling table 10 in the standard present-day machines results in positioning a bottle on each of the container supporting platforms 12. Regardless of whether the dial 23 is an infeed or an outfeed dial, it must operate in time sequence with the rotation of the filling table of the filling machine so as to properly position and remove containers from the platforms 12 and transfer them onto the platforms 16 of the capping mechanism 14. The capping mechanism 14 is so designed as to have its platforms spaced to receive containers successively from the outfeed dial 23 of the filling machine 10. Although the capping mechanism 14 is shown as having eight dials and, thus, is timed to rotate slightly less than one revolution for each revolution of the dial 23 feeding containers thereto, it is of course within the scope of the invention that the capping mechanism could be arranged with platforms in any number to conveniently receive containers from the outfeed dial 23 of the filling machine 10.

As mentioned above, the existing standard bottle equipment can accommodate containers varying in size from a half gallon down to one-half pint. The only change necessary in the machine is to change the dial 23 to a dial having pockets of suitable size to receive the size container being filled. In other words, if a one quart bottle is being filled the capping mechanism and the filling machine 9 are adjusted to accommodate for the height of the container in the manner described in the aforementioned Stewart and Franz Patent No. 2,329,954 and then the dials 23 are changed to dials having pockets of a size to receive a one quart bottle. As mentioned above, the only difference in dials 23 for the limited range of bottle sizes is the size of the pockets in the dial, the dials all having the same number of pockets.

In present-day bottling plants the trend is to fill containers of sizes even larger than the one-half gallon bottle. Today the trend is to fill bottles as large as one gallon, these bottles being generally square in cross-section. Bottles of one gallon size cannot be placed under successive heads or filling valves 30 of the filling machine 9 as there is insufficient room for the large body size of the bottles on successive platforms. Efforts have been made to position large size bottles on every other platform of the filling machine but this necessitated varying the sprockets and drive gears for the filling machine, capping mechanism, and transfer dials. The transfer dials 22, 24 and 28 of the present invention eliminate the necessity to adjust the drive for the various elements and, the use of these dials converts the machine by merely replacing existing dials of the machine. A more detailed description of the transfer dials 22, 24 and 28 will follow later in the specification.

Figure 2:
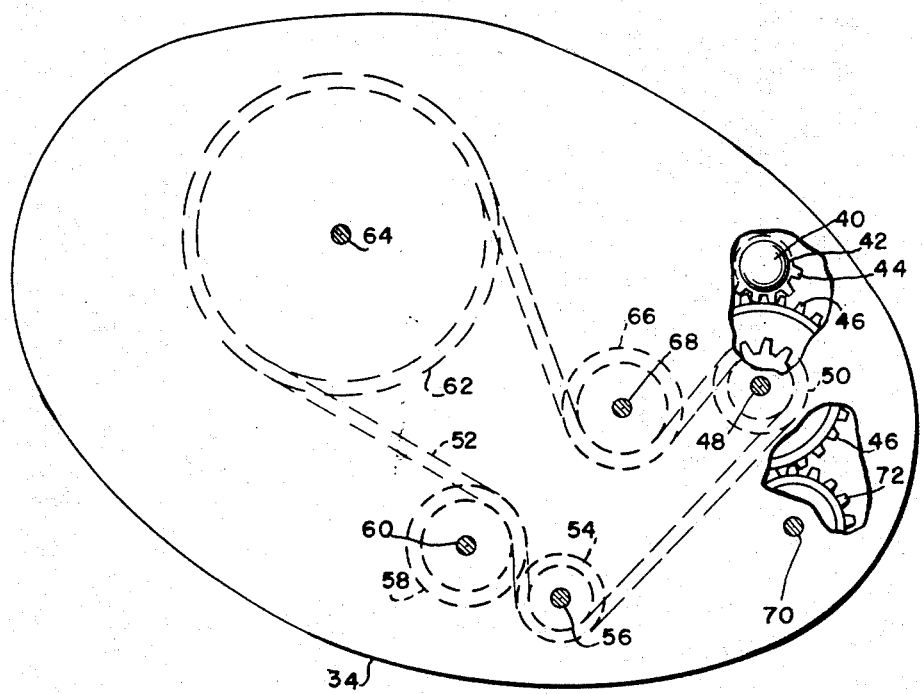
Figure 2 is a schematic view showing the drives for the various units of the present invention.

Referring now to Figure 2 of the drawing, the drive for the various units of the machine is schematically shown. A source of power 40, which may be an electric motor or the like, is mounted on the work table 34. A speed reduction unit 42 is driven by the motor 40 in any suitable manner and is provided with a pinion gear 44 which is adapted to mesh with a larger pinion gear 46 carried on a vertical shaft 48 which supports the rotatable capping mechanism 14. Shaft 48 which is journaled for rotation in work table 34 is provided with a sprocket wheel 50. The sprocket wheel 50 drives an endless chain 52 in a clockwise direction. The chain 52 passes around an idler sprocket 54 mounted on a vertical shaft 56 rotatably journaled in the work table 34, and then around a sprocket 58 carried on a shaft 60 which also carries the infeed dial 22. From the sprocket 58, the endless chain 52 passes around a large sprocket 62 carried on a drive shaft 64, the drive shaft supporting and rotating the filling table 10. Sprocket chain 52 then moves about a sprocket 66 fixed to a vertical shaft 68 which supports the outfeed dial 24. It will be noted that infeed dial 22 and outfeed dial 24 rotate in a counterclockwise direction while the filling machine table 10 and the capping mechanism 14 rotate in a clockwise direction. Transfer dial 28 is carried on a vertical shaft 70, the shaft 70 being provided with a pinion gear 72 which meshes with the pinion gear 46. Pinion gear 72 will drive the transfer spider 28 in a counterclockwise direction, as shown.

A guide plate 74 (Figure 1) is positioned above the work table 34 as shown in Figure 1. The guide plate 74 retains containers 18 in the pockets of the dials 22, 24 and 28 as they are being transferred to and from the filling machine and capping mechanism respectively.

The dials 22, 24 and 28 of the present invention are each provided with three pockets 78 along a portion of their periphery, the pockets being equally spaced from each other. The remaining portion of the periphery of the dials 22, 24 and 28 defines a spacer portion 80, the spacer portion 80 being of sufficient size to cause two successive platforms on the filling machine to be skipped when containers are being transferred thereto. In more detail, the three pockets on the dials 22, 24 and 28 are spaced apart 102 6/7°, whereas the spacing between the two pockets immediately adjacent the spacer portion 80 is 154 2/7°. There are twenty-eight platforms 12 about the periphery of rotary filling table 10, the platforms being spaced apart 12 6/7°.

The positioning of the pockets 78 in the manner just previously described causes containers 18 to be transferred onto the platforms 12 of the filling machine 9 in a definite pattern. The successive pockets which are 10 2/7° apart will position containers on every other platform of the filling machine, as shown in Figure 1, whereas the spacer portion 80 causes two successive platforms of the filling machine to be skipped. In other words, one complete revolution of the rotary table 10 will result in four complete revolutions of the dial 22 and, thus, twelve containers 18 will be positioned on the platforms in the pattern described. The same platforms will be used on each revolution of the rotary filling table. By positioning the pockets in the dials 22, 24 and 28 in the manner described, the dials may be interchanged with the seven pocket dials now presently used without changing the drive mechanism disclosed in Figure 2. This greatly enhances the speed of operation when converting the machine from one size container to another size container.

Since containers of one gallon size are usually square in cross-section, the pockets of the transfer dials 22, 24 and 28 must be made relatively deep and substantially of complementary shape to the shape of the container. The pockets of the dials are made deep so that the dials do not have to be made larger in over-all diameter than the dials previously used on the machine and, further, deep pockets prevents the containers from revolving concentrically around the centers of the dials. By preventing the containers from revolving concentrically around the centers of the transfer dials the guide plate 74 does not have to be strengthened at the points A and B.

A wiper member 82 shown in Figure 1 and in Figure 3 is carried by the table 34 beneath the star wheels 22 and 24. Any suitable bracket 84 may be rigidly mounted to the table for carrying the wiper 82. The wiper 82 engages the container 18 as it is being transferred by the dials 22 and 24 and gradually shifts the containers outwardly of the pocket so that when the container is positioned on the platforms it will be centrally under the filling valve 30 or the capping mechanism (not shown).

It will be clear from the above that the construction of the present machine is such that prior filling and capping mechanisms may be easily and inexpensively converted to accommodate different size containers, especially containers varying greatly in diameter and that the present machine otherwise fulfills the various objects of the invention.

The terminology used in this specification is for the purpose of description and not limitation, the scope of the invention being defined in the claims.

We claim:

1. In combination, a mechanism for performing operations upon containers, said mechanism including a rotary table having a plurality of container receiving platforms, a rotary dial for transferring containers to the platforms of said rotary table, said rotary dial having a plurality of container receiving pockets evenly spaced throughout a portion of its periphery, said rotary dial having the remaining portion of its periphery defining a spacer portion, means to rotate said rotary dial a plurality of complete revolutions for each revolution of said rotary table, said rotary dial having its pockets spaced apart a distance to position containers on alternate platforms of said rotary table while said spacer portion of said dial causes the skipping of at least two successive platforms during its travel past said rotary table.

2. In combination, a mechanism for performing operations upon containers, said mechanism including a rotary table having a plurality of container receiving platforms thereon, a rotary dial for transferring containers to said platforms, said rotary dial having a plurality of container receiving pockets evenly spaced throughout a portion of its periphery, said rotary dial having the remaining portion of its periphery defining a spacer portion, means to rotate said rotary dial a number of revolutions divisible of the number of platforms of said rotary table during each revolution of said rotary table, said plurality of container receiving pockets being so positioned on the periphery of said dial as to position containers on alternate platforms of said rotary table during a portion of a revolution of said dial and to skip a plurality of platforms during the remaining portion of the revolution of said dial.

3. A combination of the character described in claim 2 wherein said rotary table has a ratio of the number of platforms to the number of pockets in said dial so that during each successive revolution of said rotary table the same platforms receive containers transferred from pockets of said rotary dial.

4. A combination of the character described in claim 2, including a second rotary dial for transferring containers from the platforms of said rotary table, said second rotary dial having the same number of container receiving pockets on a portion of its periphery as said first rotary dial, the container receiving pockets of said second dial being spaced apart on the periphery of said second dial the same distance apart that the container receiving pockets of said first dial are positioned apart.

5. A combination of the character described in claim 4, including means to rotate said second rotary dial at a speed equal to the speed of rotation of said first rotary dial.

6. A combination of the character described in claim 2, wherein said platforms of said rotary table are spaced apart from each other in the order of 12 6/7° and the pockets of said rotary dial are spaced apart from each other in the order of 102 6/7°.

7. In combination, a mechanism for performing operations upon containers, said mechanism including a rotary table having a plurality of container receiving platforms thereon, a rotary dial having container receiving pockets on its periphery for transferring containers to the platforms of said rotary table, means to rotate said rotary dial in timed relation with said rotary table so that successive pockets of said dial position containers on successive platforms of said rotary table, and a second rotary dial interchangeable with said first rotary dial and permitting said mechanism to accommodate larger containers without changing timing of said drive means, said second rotary dial having a plurality of container receiving pockets evenly spaced throughout a portion of its periphery, said second rotary dial having the remaining portion of its periphery defining a spacer portion, the pockets of said second rotary dial being spaced apart from each other a distance so that containers being transferred thereby are positioned on alternate platforms of said rotary table, said spacer portion of said second dial causing the skipping of at least two successive platforms during its travel past said rotary table.

8. A combination of the character described in claim 7, wherein said rotary table has a ratio of the number of platforms to the number of pockets in said second dial so that during each successive revolution of said rotary table the same platforms receive containers transferred from the pockets of said second rotary dial.

9. In combination, a stationary frame structure, a rotary table carried on said stationary frame structure and rotatable about a vertical axis, said rotary table including a plurality of vertically movable container supporting platforms on its periphery and a filling head positioned vertically above and in alignment with each of said platforms, a rotary dial for transferring containers to the platforms of said rotary table, said rotary dial being journaled on a vertical axis in said stationary frame structure, a portion of the periphery of said rotary dial having a plurality of container receiving pockets evenly spaced from each other and the remaining portion of said rotary dial defining a spacer portion, means to rotate said rotary dial a plurality of complete revolutions for each revolution of said rotary table, said rotary dial having its pockets spaced apart a distance to position containers on alternate platforms of said rotary table while said spacer portion of said dial causes the skipping of at least two successive platforms during its travel past said rotary table, and means carried by said stationary frame structure for gradually shifting containers radially outwardly of the pockets of said rotary dial so that when containers are transferred to said container supporting platforms the containers are positioned centrally beneath the filling head.

10. A combination of the character described in claim 9, wherein the number of revolutions of said rotary dial for each revolution of said rotary table is divisible by the number of container supporting platforms carried by said rotary table.

11. In combination, a mechanism for performing operations upon containers, said mechanism including a rotary table having a plurality of container-receiving platforms, a rotary dial for transferring containers to the platforms of said rotary table, said rotary dial having a plurality of container-receiving pockets evenly spaced throughout a portion of its periphery, said rotary dial having the remaining portion of said periphery defining a spacer portion separating two adjacent container-receiving pockets a greater distance apart than adjacent evenly spaced container-receiving pockets, and means to rotate said rotary dial in synchronism with said rotary table, said evenly spaced container-receiving pockets of said rotary dial transferring containers to certain platforms of said rotary table in a predetermined sequence during a portion of a revolution of said dial, and said spacer portion of said dial causing skipping of platforms normally receiving containers in said predetermined sequence during the remaining portion of the revolution of said dial.

References Cited in the file of this patent

UNITED STATES PATENTS

| | | |
|---|---|---|
| 1,502,201 | Jaeger | July 22, 1924 |
| 1,924,146 | Almgren | Aug. 29, 1933 |
| 2,007,981 | Nordquist | July 16, 1935 |
| 2,304,905 | Gantzer | Dec. 15, 1942 |

FOREIGN PATENTS

| | | |
|---|---|---|
| 858,650 | Germany | Dec. 8, 1952 |